United States Patent [19]

Freissle

[11] Patent Number: 4,892,767

[45] Date of Patent: Jan. 9, 1990

[54] SCREENING ARRANGEMENT

[75] Inventor: Manfred F. A. Freissle, Birkenweg, Fed. Rep. of Germany

[73] Assignee: Screenex Wire Weaving Manufacturers (Proprietary) Limited, Alberton, South Africa

[21] Appl. No.: 284,934

[22] Filed: Dec. 15, 1988

[30] Foreign Application Priority Data

Sep. 29, 1988 [ZA] South Africa ...................... 88/7318

[51] Int. Cl.[4] ............................................. B32B 3/12

[52] U.S. Cl. .................................... 428/52; 209/414; 428/99; 428/120

[58] Field of Search .................. 209/400, 414; 428/52, 428/99, 119, 120

[56] References Cited

U.S. PATENT DOCUMENTS 3,446,692 5/1969 Turnbull ............................ 428/120
3,605,166 2/1969 Chen .............................. 428/116 X
4,120,785 10/1978 Itanamori et al. .............. 209/400 X
4,361,614 11/1982 Moffitt, Jr. ..................... 428/133 X
4,743,740 5/1988 Adee ............................... 428/131 X
4,761,926 8/1988 Rea et al. ........................ 428/131 X
4,819,809 4/1989 Derrick ........................... 209/400 X

FOREIGN PATENT DOCUMENTS 538559 9/1981 Australia ............................... 428/99
2437809 3/1975 Fed. Rep. of Germany ........ 428/52

*Primary Examiner*—Henry F. Epstein
*Attorney, Agent, or Firm*—Curtis, Morris & Safford

[57] ABSTRACT

The invention provides for a screening element which is predominantly of a synthetic plastics material and which has a screening surface formed by a plurality of ribs extending within a surround across the element, the ribs each being of a zig-zag configuration and the ribs being spaced from each other to define between them screening apertures, the ribs being resiliently deformable.

10 Claims, 4 Drawing Sheets

SCREENING ARRANGEMENT

BACKGROUND TO THE INVENTION

THIS INVENTION relates to a screening arrangement. The invention relates in particular to a screening arrangement for screening particulate materials such as mineral ores. More particularly, the invention relates to screening elements and to screen decks.

The Applicant is aware of screen decks which are of stretchable mats or of a modular configuration comprising a plurality of panels which are releasably secured in a side-by-side relationship on a support frame. When certain types of ore are screened, it sometimes happens that the apertures in the screen deck become blocked and the deck and the screen deck, or portions of the screen deck, then become blinded. This leads to screening inefficiency.

It is an object of the invention to provide a screening arrangement which overcomes or alleviates the above-mentioned problem.

BRIEF DESCRIPTION OF THE INVENTION

According to the invention there is provided a screening element which is predominantly of a synthetic plastics material and which has a screening surface formed by a plurality of ribs extending within the surround across the element, the ribs each being of a zig-zag configuration and the ribs being spaced from each other to define between them screening apertures, the ribs being resiliently deformable. The ribs may be so positioned and spaced from each other that rows of apertures spaced from each other are defined between the ribs. The zig-zag configuration of the ribs may be angular so that substantially rectangular-shaped apertures are defined between the ribs. Alternatively, the zig-zag configuration of the ribs may be curved so that substantially curved screening apertures are defined between the ribs.

Apertures in each row of screening apertures adjacent the periphery of the screening element may be open on one side, and apertures in each row inwardly of these apertures may be open on two sides.

The screening element may be a panel having securing means adapted to secure the panel releasably in a side-by-side relationship with similar panels, the panel having a surround around the screening surface and the ribs extending within the surround across the panel.

The panel and the ribs and the securing means may be of the same material and may be unitary and in one piece.

The securing means on the screening panel may comprise a plurality of deformable spigot-like protrusions spaced from each other along the peripheral region of the panel. The protrusions may be adapted to fit in pairs with the protrusions of an adjacent similar panel in complementary spaced apertures in a support structure which may be a frame. The protrusions may be solid. Alternatively, the protrusions may be half-tubular so that when such protrusions are fitted in pairs in the apertures of a support frame, the protrusions form tubular bores into which securing pins may be fitted to spread the protrusions to engage the support frame.

If desired, the screening panel may be reinforced eg by steel reinforcing.

In an alternative arrangement, the screen element may be a rectangular mat adapted to be fitted in a tensioned condition by being secured along two opposed sides and being stretched between these two sides, the ribs extending in the direction of stretching.

Each rib may taper in the direction of flow of material through the screening surface to thereby define screening apertures which diverge in the direction of flow of material through the apertures.

The screening element may be moulded, eg by injection moulding, and the synthetic plastics material may be polyurethane.

The invention extends to a screen deck including a support structure and one or more screening elements in accordance with the invention, arranged on the support structure.

BRIEF DESCRIPTION OF THE DRAWINGS

The invention is now described with reference to the accompanying drawings, in which.

DETAILED DESCRIPTION OF THE PREFERRED EMBODIMENTS

Figure 1:
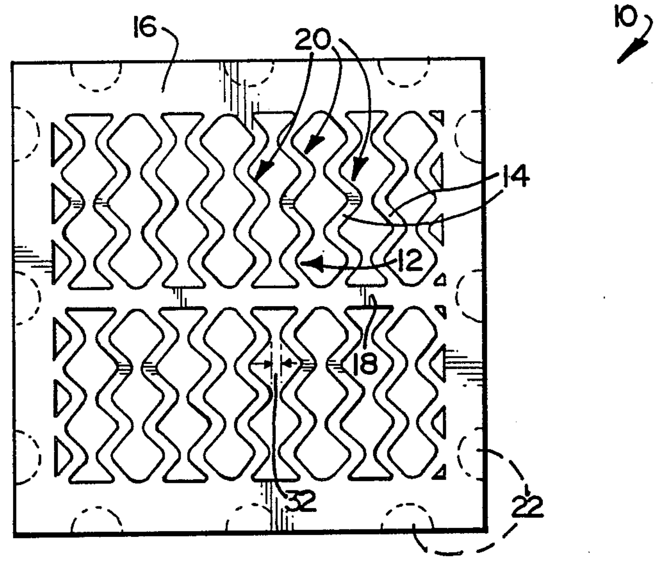
FIG. 1 shows a plan view of one embodiment of a screening element in accordance with the invention.
Figure 2:
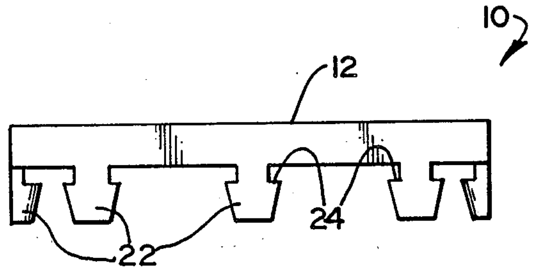
FIG. 2 shows a side view of the screening element of FIG. 1.

Referring to FIGS. 1 and 2 of the drawings, reference numeral 10 indicates in general a screening element in the form of a panel which is of a hard-wearing synthetic plastics material, eg polyurethane, having a Shore hardness of 70–90, depending on the type of particulate material to be screened. The panel has a screening surface 12 formed by a plurality of zig-zag-shaped ribs 14. The panel has a surround 16 and a transverse rib 18 extending across the panel between two opposing surround sides.

The zig-zag-shaped ribs 14 extend between the surround 16 and the transverse rib 18. The ribs are of the same synthetic plastics material as the surround 16, and are unitary with the surround. The ribs 14 are spaced from each other and their zig-zag configuration is such that they define berween them rectangular-shaped apertures 20. The apertures are open-ended along one or two sides, depending on whether they are adjacent the surround 16 of the rib 18, or are intermediate and inwardly from the surround 16 and the transverse rib 18. The zig-zag ribs 14 are flexible and are resiliently deformable and are more flexible than the surround 16.

Figure 3:
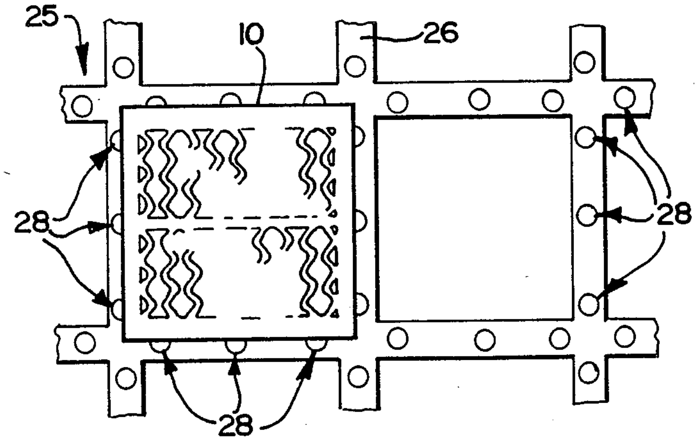
FIG. 3 shows a fragmentary plan view of a screen deck comprising one screening element as in FIG. 1, in position on a support frame.

Referring further to FIGS. 1 and 2, the screening panel 10 has a plurality of protrusions 22 provided along the entire peripheral edge of the panel 10 as shown, or it may be provided along only some of the peripheral edges of the panel. The protrusions 22 are spigot-like of tapering configuration and with shoulders 24 which abut a support frame in which the protrusions are fitted, as shown in FIG. 3. The protrusions 22 are of the same material as the panel 10, and are integral with the panel and are resiliently deformable to permit the protrusions to be inserted into and to be removed from the apertures in the support frame 26, as shown in FIG. 6.

Referring to FIG. 3, there is shown a screen deck 25 comprising a support frame 26, with a screening panel 10 of FIG. 1 positioned thereon. The support frame 26 is a lattice-work of steel sections of L- or U-cross-section. A plurality of apertures 28 are provided in the support frame 26, the spacing between the apertures 28 corresponding to the spacing of the protrusions 22 of the panel 10 from each other, the protrusions 22 being shown in FIG. 2. The panel 10 is fitted onto the support frame 26 by inserting the protrusions 22 into the apertures 28.

Figure 4:
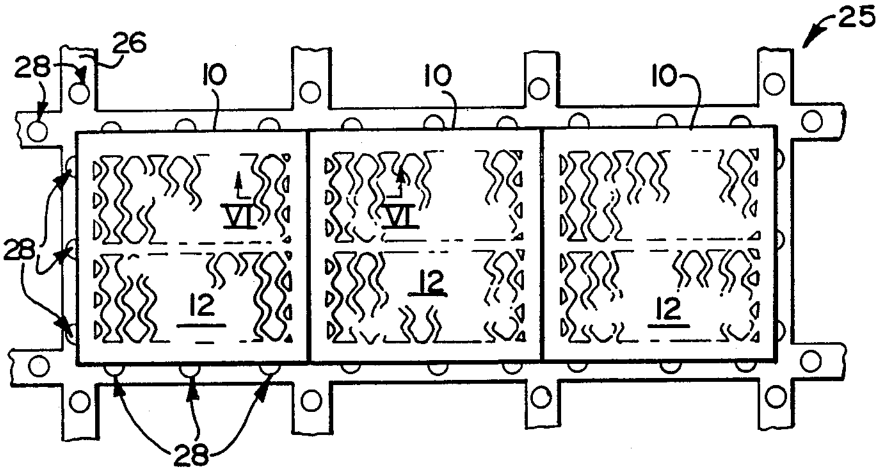
FIG. 4 shows a fragmentary plan view of a screen deck similar to that shown in FIG. 3, but with three screening elements of FIG. 1, in position on a support frame.
Figure 5:
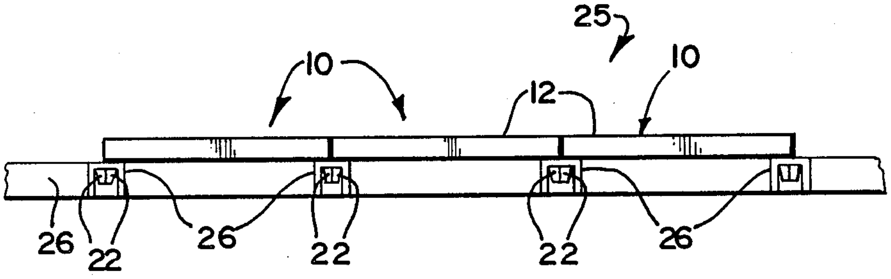
FIG. 5 shows a side view of the screen deck shown in FIG. 4.

FIGS. 4 and 5 show a screen deck 25 similar to that shown in FIG. 3, except that three screening panels 10 are fitted adjacent each other in a side-by-side abutting relationship on the support frame 26. The protrusions 22 on adjacent screening panels 10 are fitted in pairs into the apertures 28 in the support frame 26, as shown in FIG. 6. As shown, the shoulders 24 on the tapering protrusions 22 abut the rim 30 of the frame 26 defining the aperture 28. Since the protrusions 22 are of a deformable synthetic plastics material, they can be withdrawn from the apertures 28 to release the panels 10.

Figure 6:
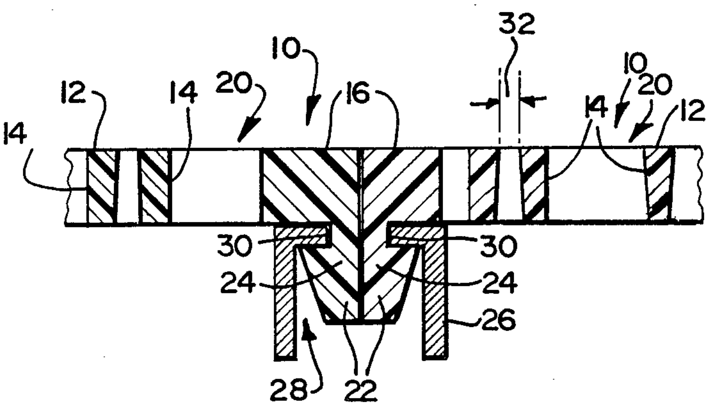
FIG. 6 shows, on an enlarged scale, a fragmentary section along line VI—VI in FIG. 4.

Referring further to FIG. 1 and also to FIG. 6, it will be noticed that the zig-zag ribs 14, at their closest, are spaced a distance 32 from each other. This ensures that the ribs 14, when the panel is not in use, do not abut each other. This permits the ribs 14 to vibrate independently of each other when the panels are vibrated on the support frame 26 during a screening operation. If further permits the ribs to be deformed in a lateral direction so that thereby the apertures 20 defined between them can be enlarged. The effect of these features is that when material is screened and the material becomes stuck in the apertures 20 between the ribs 14, the ribs can flex independently of each other during the vibration to which the panels on the screen deck are subjected during the screening operation, and thereby the material blocking the apertures 20 can be dislodged. In this manner, the blinding of the screen panels 10 is avoided, or blinding is alleviated.

Referring further to FIG. 6, it will be noticed that the ribs 14 in cross-section have a slight downward taper. This downward taper also assists in preventing blocking of the apertures 20 and thus in preventing blinding of the screening surfaces 12 of the panels 10.

The entire screening panel 10, including the surround 16, the transverse rib 18, the zig-zag ribs 14 and the protrusions 22 are formed in one piece by means of injection moulding from a suitable polyurethane material.

Figure 7:
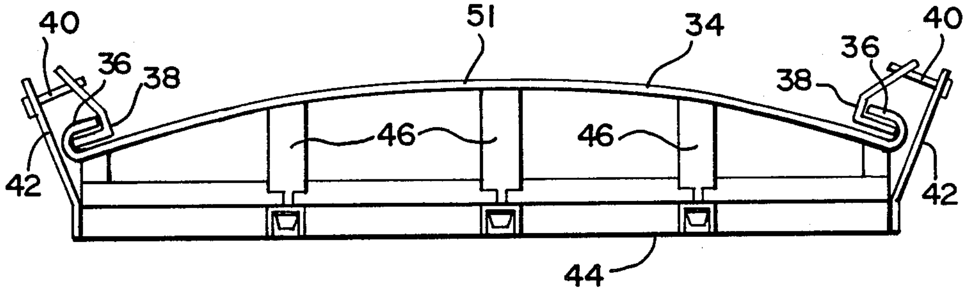
FIG. 7 shows diagrammatically a side view of another embodiment of a screening element in accordance with the invention.
Figure 8:
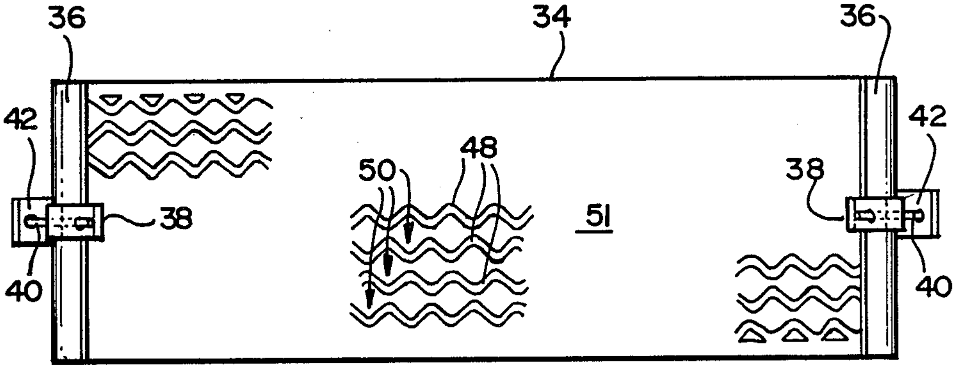
FIG. 8 shows diagrammatically a fragmentary plan view of the screening element shown in FIG. 7.

Referring to FIGS. 7 and 8, an alternative embodiment of a screening element in accordance with the invention is shown diagrammatically. In this embodiment, the screening element comprises a mat 34 of a synthetic plastics material, the same as or similar to the material of the screening element 10 shown in FIG. 1. The mat 34 is of oblong rectangular shape and has hooks 36 at its two short sides. Clamps 38, adjustable by screws 40, are provided. The screws 40 engage the clamps 38 and secure them to brackets 42. The brackets 42 are attached to a support structure 44. Supports 46 of varying heights are provided between the support structure 44 and the mat 34. The mat 34 has zig-zag-shaped ribs 48, similar to the ribs 14 of the panel 10 shown in FIG. 1. The ribs 48 define between them spaced apertures 50, similar to the apertures 20 in the panel 10 illustrated in FIG. 1, forming a screening surface 51.

Figure 9:
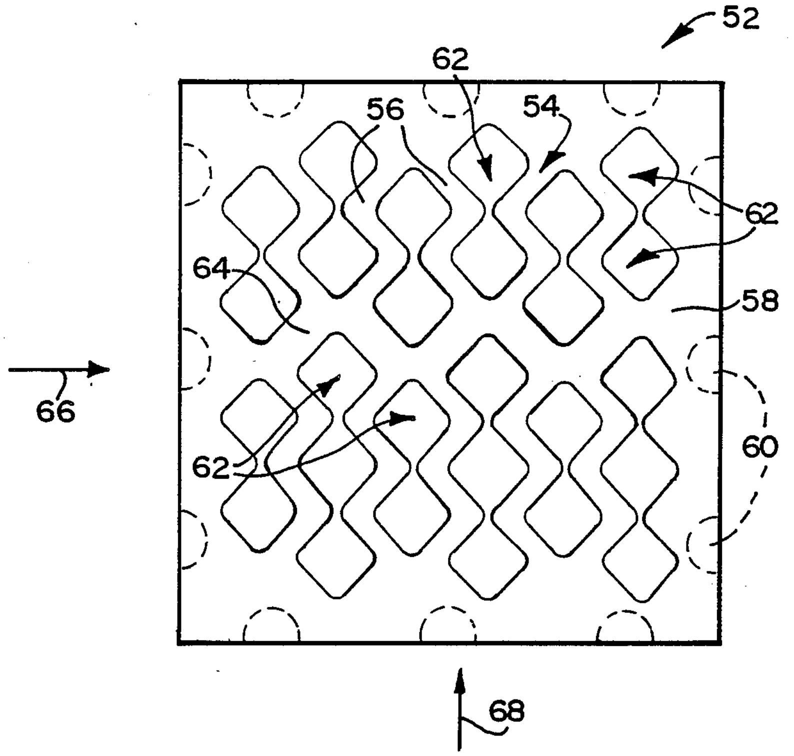
FIG. 9 shows a plan view of another embodiment of a screening element similar to that shown in FIG. 1.

The mat 34 is fitted on the support structure 44 by hooking the hooks 36 into the clamps 38 and tightening the screws 40. Thereby the mat 34 is stretched in a slightly curved condition over the supports 46, and is thus secured on the support structure 44 in a tensioned condition, to form a screen deck 51. The direction of stretch of the mat 34 during the tensioning operation is in the same direction as the longitudinal direction in which the ribs 48 extend. The function and operation of the ribs 48 in the mat 34 are the same as those of the ribs 14 in the screening panel 10 described with reference to FIG. 1. Referring to FIG. 9, there is shown a plan view of a screening element 52 in the form of a panel similar to the screening panel 10 shown in FIG. 1. It has a screening surface 54 formed by a plurality of zig-zag-shaped ribs 56 similar to the ribs 14 of the panel 10. The panel has a surround 58 in which there are spigot-like protrusions 60 similar to the protrusions 22 of the panel 10. The ribs 56 define between them apertures 62 similar to the apertures 20 of the panel 10. Unlike the panel 10, however, the panel 52 does not have a straight transverse rib 18, but instead has a zig-zag-shaped transverse rib 64. A reinforcing element (not shown) of steel may be embedded in the rib 64 to strengthen the panel 52. The advantage of the rib 64 is that by being of a zig-zag shape it prevents there being a straight path across the panel along which material can flow without being screened. Thus, viewing the plan view of the panel 52 as shown in FIG. 9, it will be noticed that there are no straight paths across the panel, regardless of whether material flows across the panel in the direction of arrow 66, or in a transverse direction across the panel in the direction of arrow 68. This ensures that material to be screened flowing across the panel will only be able to run for a short distance across the ribs 56 and will then be forced to drop into the apertures 62, to be screened. If further desired, additional reinforcing material (not shown) may be provided in the surround 58 to strengthen the panel 52 further.

Figure 10:
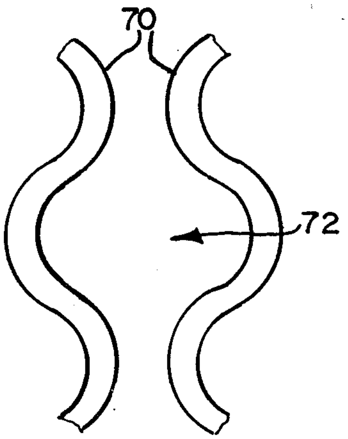
FIG. 10 shows, on an enlarged scale, a fragmentary plan view of an alternative rib configuration to that shown in the screening element of FIG. 1.

Referring to FIG. 10, there is shown a fragmentary plan view on an enlarged scale of zig-zag-shaped ribs 70, similar to the ribs 14 in the screening panel 10 shown in FIG. 1. The difference is that the ribs 70 are of a curved shape so that substantially curved apertures 74 are defined between the ribs 70. The apertures 72 may be substantially of elliptical shape or circular shape.

Figure 11:
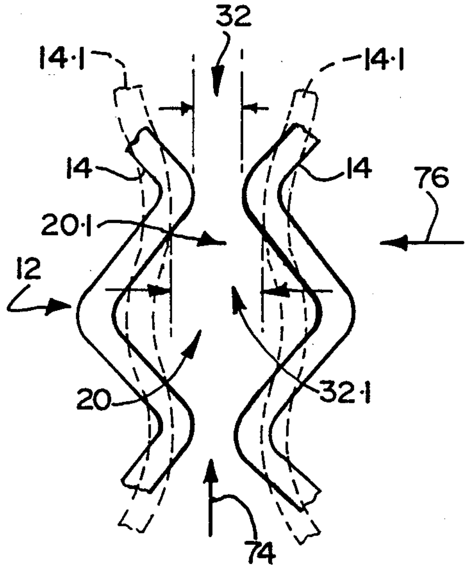
FIG. 11 shows, on an enlarged scale, a fragmentary plan view of the deformation of the ribs shown in the screening element of FIG. 1.

Referring to FIG. 11, there is shown a fragmentary plan view on an enlarged scale of the ribs 14 of the screening panel 10 shown in FIG. 1. FIG. 11 illustrates on a greatly enlarged scale how the ribs 14 deform when loaded with material and during a screening operation. During the screening operation the ribs 14 vibrate, as mentioned above. During each vibration, each rib 14 tends to straighten from the position shown in solid lines to the more straightened condition shown in broken lines by 14.1. This deformation is small, but the effect is that the spacing 32 between the ribs 14 is enlarged to the spacing 32.1 between the ribs in their more straightened position indicated in broken lines 14.1. The effect of this is that material which may be lodged in the gap 32 will be dislodged when the gap widens to 32.1. Thereby bridge-building of material in the gap is prevented and blinding of the screen is prevented or alleviated. A further effect of the tendency of the ribs 14 to straighten during vibration and loading is that it enhances the flexibility of the ribs, and this results in a screening surface 12 on the panel 10 which is more spingy in that it can vibrate more vigorously during operation. This enhances the screening efficiency of the panel.

Referring further to FIG. 11, a further function of the zig-zag shape of the ribs 14 is that is prevents the forming of bridges across the panel in that it breaks the travelling path of material moving in the direction of arrow 74, or in the direction of arrow 76, across the screening surface 12 during a screening operation. In view of the zig-zag configuration of the ribs 14, material which travels across the screening surface 12 in the direction of either arrow 74 or arrow 76 can only move across a portion of the rib 14 for a short distance before having to drop into a screening aperture 20.

Referring further to FIG. 11, as mentioned above, material to be screened may travel across the screening surface 12, either in the direction of arrow 74 or in a transverse direction in the direction of arrow 76. When the material travels across the screening surface 12 in the direction of arrow 76, it will depress the rib 14, shown in the right hand side on the drawing, before the material reaches the rib 14 on the left hand side on the drawing. By thus depressing the one rib 14 relative to the other, there is a slight difference in level between the ribs. The effect of this is that when the material reaches the rib on the left, which is at a slightly higher level, the rib presents a slight ridge against which the material has to abut. This assists in forcing the material to drop into the screening aperture 20. Thereby the screening efficiency of the screening surface 12 is enhanced. This effect of forming a ridge is more pronounced when the rib 14 has a downward taper, as shown in FIG. 6, since the ridge then has a sharper edge.

Referring still further to FIG. 11, when the material travels across the screening surface 12 in the direction of arrow 74, it will be appreciated that the downstream side of the screening aperture 20, ie the region 20.1 between the ribs 14, has a convergent shape. The effect of this is that material travelling across the screening surface 20 in the direction of arrow 74 is funnelled into the screening aperture 20, thereby assisting in forcing the material to drop into the aperture 20, and thereby enhancing the screening efficiency of the screening surface 12.

Referring further to FIGS. 1, 8, 9, 10 and 11, an effect of the zig-zag-shaped ribs 14, 48, 56 and 72 is that the apertures defined between them are continuous in that the one aperture runs into the adjacent one. The overall effect of this is that a larger open or apertured area is provided in the screening surfaces of the screening elements 10, 34 and 52, and this further assists in the screening efficiency of the screening elements in accordance with the invention.

It is accordingly an advantage of screening elements in accordance with the invention that they assist in preventing or alleviating the blocking or blinding of the screening elements during the screening of particulate material.

What is claimed is:

1. A screening element for screening a load of material and which is predominately of a synthetic plastics material and which has a screening surface formed by a plurality of ribs extending across the element, the ribs each being of a zig-zag configuration and the ribs being spaced from each other to define between them screening apertures, portions of adjacent ribs being closely spaced from and opposed to each other but not abutting against each other and other portions of adjacent ribs being further spaced from and opposed to each other so that the screening apertures defined between the ribs have alternate wide and narrow regions, the ribs being resiliently deformable independently of each other under the load of material to be screened and the ribs tending to straighten during deformation under the load.

2. A screening element as claimed in claim 1, in which the ribs are so positioned and spaced from each other that rows of screening apertures, spaced from each other, are defined between the ribs.

3. A screening element as claimed in claim 1, in which the zig-zag configuration of the ribs is angular so that substantially rectangular-shaped screening apertures are defined between the ribs.

4. A screening element as claimed in claim 1, in which the zig-zag configuration of the ribs is curved so that substantially curved screening apertures are defined between the ribs.

5. A screening element as claimed in claim 2, in which the apertures in each row of screening apertures adjacent the periphery of the screening element are open on one side, and apertures in each row inwardly of these apertures are open on two sides.

6. A screening element as claimed in claim 1, which is a panel having securing means adapted to secure the panel releasably in a side-by-side relationship with similar panels, the panel having a surround around the screening surface and the ribs extending within the surround across the panel.

7. A screening element as claimed in claim 6, in which the panel and the ribs and the securing means are of the same material and are unitary in one piece.

8. A screening element as claimed in claim 6, in which the securing means on the panel comprise a plurality of deformable spigot-like protrusions spaced from each other along the periphery of the panel, the protrusions being adapted to fit in pairs with the protrusions of an adjacent similar panel in complementary spaced apertures in a support structure.

9. A screening element as claimed in claim 1, which is a rectangular mat adapted to be fitted in a tensioned condition by being secured along two opposed sides and being stretched between these two sides, the ribs extending in the direction of stretching.

10. A screening element as claimed in claim 1, in which each rib tapers in the direction of flow of material through the screening surface to thereby define screening apertures which diverge in the direction of flow of material through the apertures.

* * * * *